United States Patent [19]

Miyazaki et al.

[11] Patent Number: 4,659,208

[45] Date of Patent: Apr. 21, 1987

[54] METHOD AND MECHANISM FOR PREVENTING MISOPERATION OF DUAL MODE COPYING MACHINE

[75] Inventors: Masayuki Miyazaki; Yoshihiko Kudo; Seizi Takahashi; Chiharu Kobayashi; Akira Sawaki, all of Hachioji, Japan

[73] Assignee: Konishiroku Photo Industry Co., Ltd., Tokyo, Japan

[21] Appl. No.: 757,784

[22] Filed: Jul. 22, 1985

[30] Foreign Application Priority Data

Jul. 26, 1984 [JP] Japan .................. 59-155752

[51] Int. Cl.$^4$ .................................. G03G 15/00
[52] U.S. Cl. .................. 355/8; 355/3 R; 355/14 R
[58] Field of Search ............... 355/8, 3 R, 14 R, 14 C

[56] References Cited

U.S. PATENT DOCUMENTS 4,318,609  3/1982  Knechtel et al. ............... 355/8 X Primary Examiner—A. G. Prescott
Attorney, Agent, or Firm—Jordan B. Bierman

[57] ABSTRACT

A copying apparatus which performs either of two scanning functions depending on the size of original documents. In case of a large-size document, a scanning operation therefor is carried out by moving the document relative to the stationary fixed optical system responsive to selection of such scanning operation. The selection is effective only when the large-size document is detected.

6 Claims, 2 Drawing Figures

METHOD AND MECHANISM FOR PREVENTING MISOPERATION OF DUAL MODE COPYING MACHINE

BACKGROUND OF THE INVENTION

This invention relates to an electrostatic recording apparatus capable of reproducing copies from a large-sized and ordinary-sized original document.

In the case of constituting an electrostatic recording apparatus so as to reproduce copies from such a large-sized original document as an A-2 sized original document, besides from an ordinary-sized original document, when a large-sized original document is to be reproduced, an image transfer paper in the size corresponding to the large-sized original document is fed from a paper-feed section and thereon a developer image is transferred and then fixed. There may, however, be instances where the image transfer paper lies over not less than two different processing sections in the passage between the paper feed section and a paper delivery section. For example, there may be instances where the leading edge thereof enters into a fixing unit, but the trailing edge thereof is not yet separated from an electrophotoreceptor drum.

In such an instance, the image transfer and fixing may become incomplete and the image transfer paper may become creased, if the feeding speeds of the image transfer paper (i.e., the line speeds thereof) are irregular in the portion thereof, so that the image quality on the image transfer paper may be deteriorated.

It is, therefore, necessary to make the line speeds same in the portion of the image transfer paper in the fixing unit and in the portion thereof in the electrophotoreceptor drum.

If only a large-size reproduction key is provided so as to operate the selection for the reproduction mode of such a large-sized original document as described above, the large-sized original document reproduction mode can readily be provided by only operating the large-size reproduction key. Therefore, even when an ordinary-sized original document is to be reproduced, there may be instances where the large-size reproduction mode may be set by a sort of careless operation of the large-size reproduction key. If this is the case, a reproduction error will occur.

SUMMARY OF THE INVENTION

Objects of the Invention

It is an object of the invention to provide an electrostatic recording apparatus capable of reproducing a large-sized original document and an ordinary-sized original document, in which an operational error can be prevented by not so readily putting the mode thereof in a large-sized original document reproduction mode.

Constituents of the Invention

In the invention with the above-mentioned object, the setting of the large-sized original document reproduction mode is performed at least by the operation of setting a large-sized original document tray and the selection of a large-sized paper feed unit or the operation of selecting the large-sized original document reproduction.

EFFECTS OF THE INVENTION

In such an electrophoto-recording apparatus of the invention, the setting of the reproduction mode for a large-sized original document is performed at least by the operation of setting large-sized original document tray and the operation of selecting a large-sized paper feed unit or a large-sized original document reduction-reproduction. Therefore, no large-sized original document reproduction mode is carelessly selected, so that any erroneous reproduction can securely be prevented.

DETAILED DESCRIPTION OF THE INVENTION

Figure 1:
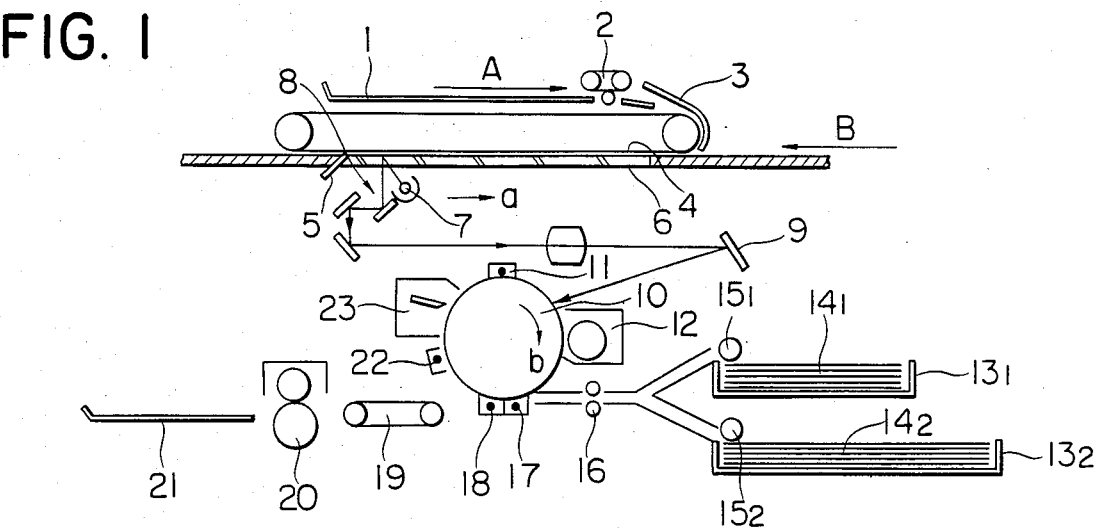
FIG. 1 illustrates a schematic construction of a reproduction apparatus having an automatic original document feed unit.

Now, an example of the invention will be described below: FIG. 1 is a schematic illustration of an electrophotographic reproduction apparatus out of the electrostatic recording apparatuses, with which an original document feed unit is equipped. In the drawing, 1 is an original document tray; 2 is an original document feed unit; 3 is a guide plate; 4 is an original document feed belt; 5 is an original document stopper; and 6 is an original document platen made of glass. Thereby the original document feed unit is comprised. A plurality of ordinary-sized original documents which are the same as or smaller than the original document platen 6 (i.e., the original documents of A3 size not larger than B4 size) are set on an original document tray 1 for the ordinary sized original documents and are drawn out one after another by original document feed unit 2 in the direction of the arrow so as to be fed on and set to the original document platen glass 6 by original document feed belt in the state that the original documents hit against original document stopper 5, and, thus, a reproduction is performed as will be described later. On the other hand, in the case of a large-sized original document such as an A2 size original document that is not smaller than the original document platen glass, any original document larger in size than A3 may be set on a larged-sized original document tray 1 (not shown) by extending the left-hand end of the tray 1; or an original document larger than A3 may be set on a tray 1 by opening the tray 1 which was folded up. In a different method, a large-sized original document is fed over to the surface of an original document platen glass 6 from the direction of the arrow B by original document feed belt 4. A reproduction is performed on the way to be fed on the surface of the original document platen glass 6. In this case, original document stopper 5 is retracted from the upper surface of the original document platen glass 6.

7 is an exposure light source. The light image of an original document obtained by the light source 7 is guided to be incident through mirrors 8 and 9 to the surface of a photoreceptor drum 10 which serves as an image-forming photoreceptor. The photoreceptor drum 10 is provided with a photoconductive layer comprising selenium or the like on the outer circumferential surface of a grounded metal cylinder, and is rotated in the direction of b.

In the photoreceptor drum 10, above-mentioned photoconductive layer thereof is charged uniformly positivewise for example by charging electrode 11 applied with a direct-current high voltage, before the light image reaches the photoreceptor drum 10. When the photoconductive layer receives the light image in such a state as mentioned above, the electric conductivity becomes higher in the portion of the layer where the light is received and the charged potential therein escapes to the metal cylinder, so that the positive charge will remain in the dark portion of the photoconductive layer according to the degree of the intensity of the light. Thereby, an electrostatic latent image is so formed on the surface of the photoconductive layer as to correspond to the original image.

When the portion on which the electrostatic image is formed reaches the area of developing unit 12, negatively charged developers are adsorbed by electrostatic force to positively charged areas remaining on the photoreceptor drum 10. Consequently, the developer image is formed correspondingly to the electrostatic latent image, on the surface of the photoreceptor drum 10.

Large-sized transfer paper $14_2$ or ordinary-sized transfer paper $14_1$ stored inside a large-size paper feed unit $13_2$ or ordinary-size paper feed unit $13_1$ is fed out by a paper feed roller $15_1$ or $15_2$ in the direction of registration roller 16 and is stopped temporarily. And, it is fed out again from the registration roller 16 at such a timing that the leading edge of the transfer paper and the leading edge of the developer image on the photoreceptor drum 10 coincide with each other. Then, the developer image registered on the photoreceptor drum 10 is transferred to the transfer paper thus fed out by an image-transfer electrode 17 to which a direct-current high tension voltage was applied.

Thereafter, the above-mentioned transfer paper is separated from the photoreceptor drum 10 by a separation electrode 18 to which an alternating-current high voltage was applied, and is conveyed to a fixing unit 20 by a conveyor belt 19 so that the developer image registered on the transfer paper can be fixed, and finally, the transfer paper is delivered to a paper receiving tray 21.

22 is an electricity neutralization electrode for neutralizing charged potential remaining on the photoreceptor drum 10; and 23 is a developer cleaning unit for cleaning the developers remaining on the surface of the photoreceptor drum 10.

When using an ordinary-sized original document with this type of reproduction apparatuses, the original document is set on the original document platen glass 6, as mentioned above. The reproduction of this case is operated in the manner that a light source 7 moves in the direction of the arrow a to scan the original document, and the photoreceptor drum 10 rotates in the direction of the arrow b, synchronizing with the scanning.

On the other hand, when using a large-sized original document, the original document is moved to be optically scanned as mentioned above in the state that the light source 7 is fixed to specific position, and the photoreceptor drum 10 is rotated in the direction of the arrow b synchronously with the moving speed of the original document.

|  | Ordinary-sized original document | Large-sized original document |
| --- | --- | --- |
| Original document feed | 800 mm/s | 230 mm/s |
| Photoreceptor drum | 330 mm/s | 230 mm/s |
| Fixing unit | 230 mm/s | 230 mm/s |
| Charging electrode | 850 μA | 720 μA |
| Exposure light source | 69 V | 55 V |
| Image-transfer electrode | 400 μA | 400 μA |
| Separation electrode | 650 μA | 650 μA |

The above table shows the principal processing conditions both required for reproducing ordinary-sized original documents and large-sized original documents.

In the case of the large-sized original documents, there are instances, as mentioned above, where the trailing edge of the original document is not still separated from photoreceptor drum 10, even when the original document is separated from the photoreceptor 10 and the leading edge of the original document is entered into the fixing unit 20 by conveyor belt 19.

In such a instance and when the line speed at the fixing unit 20 and that at the photoreceptor drum 10 are different from each other, such a variety of inconveniences will occur as mentioned above.

Therefore, in this example, and in the reproduction mode for such a large-sized original document, the line speed at the fixing unit 20 is made the same as the line speed in the reproduction mode for an ordinary-sized original document. In other words, the line speed at the fixing unit 20 is kept unchanged and the line speed at the photoreceptor drum 10 and the original document feed speed are kept up with the line speed of the fixing unit 20.

Resultantly, when putting in the reproduction mode for a large-sized original document, the line speed of the photoreceptor drum 10 and the original document feed speed are lowered.

Accordingly, in the reproduction mode for a large-sized original document, the discharged current of charging electrode 11 is lowered and the voltage of the exposure light source is also lowered, comparing with the case of reproducing an ordinary-sized original document. However, the discharged currents of image-transfer electrode 17 and separation electrode 18 are the same, provided that, with the purpose of making the potential at the photoreceptor drum 10 zero after separation, the separation electrode 18 is applied with a positive bias. This direct current bias is lessened to 20 μA in the case of using a large-sized original document, while it is 40 μA in the case of using an ordinary-sized original document.

Figure 2:
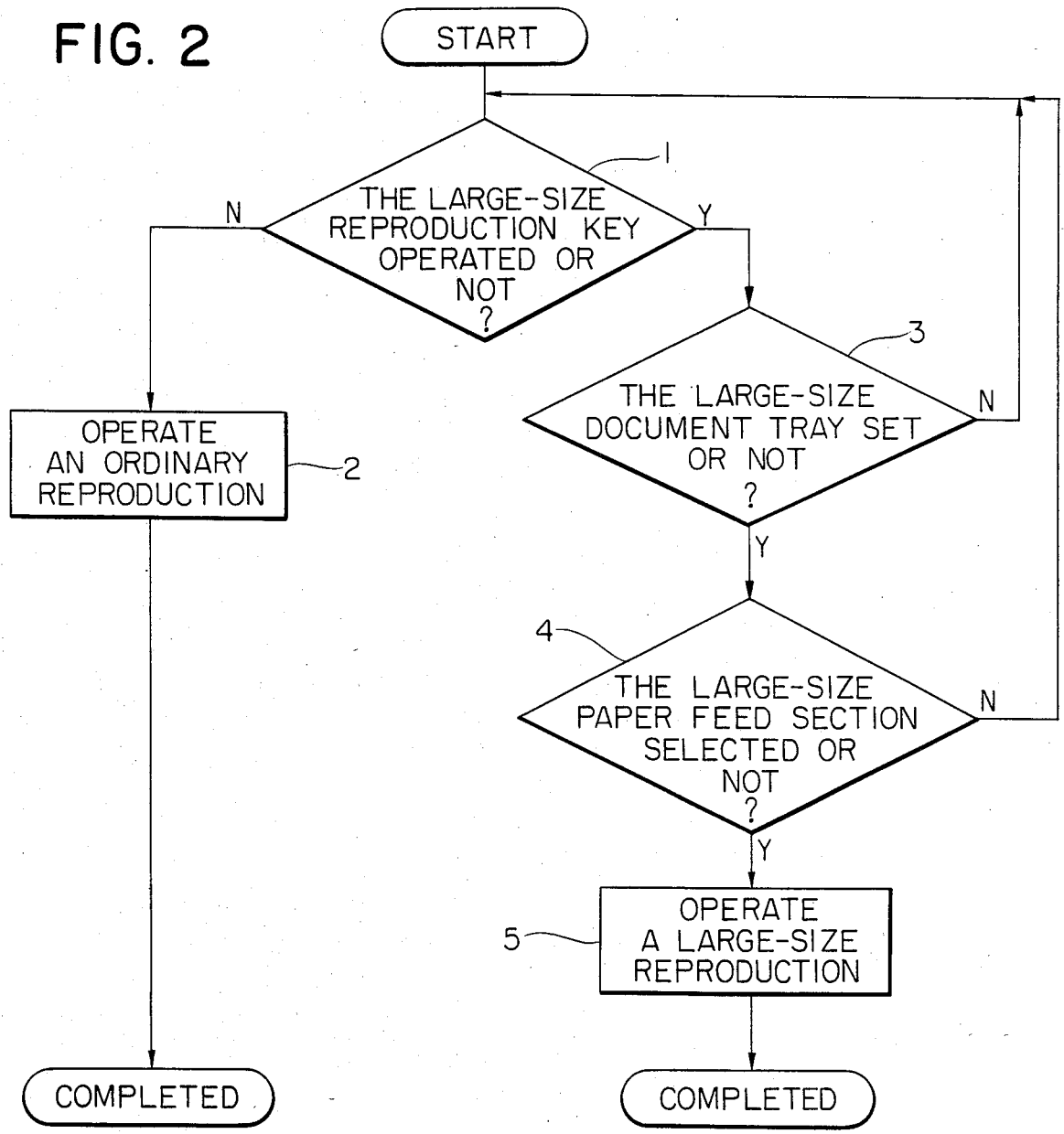
FIG. 2 is a flow-chart of how to set a reproduction mode.

Next, in this example, with the purpose of selecting a single mode from two kinds of reproduction modes of which the processing conditions thereof are quite different from each other, an arrangement is to be so made as to be able to judge as illustrated in the flow-chart given in FIG. 2.

A large-size reproduction key is provided and whether the key is operated or not is judged by step (1). If the key is not operated, step (1) judges to have been selected as in an ordinary reproduction mode and then proceeds to step (2) so as to perform a reproduction under the processing conditions for 'ordinary reproduction' given in the above table.

In the meantime, when the large-size reproduction key is operated, step (1) proceeds to the other step (3) so as to detect whether a large-size document tray (not shown) opened or drawn out to be set or whether a large-size document is fed from the direction of arrow B or not, as we indicated before. This detection is performed by arranging a sensor in the section of storing the large-size document tray or the inseting point from the direction of arrow B to document feed belt. When the large-size document tray is set or when a large-size document is detected the insertion to the original document feed unit, a judgement is to be made on whether a large-sized transfer paper $14_2$ is selected or not in the next step (4). Step (4) is not proceeded to step (5) for a large-size reproduction unitl the large-sized transfer paper $14_2$ is selected. In step (5), the large-sized original document is reproduced under the processing conditions for 'large-size reproduction' given in the table.

Accordingly, in order that a large-sized original document can be reproduced, it is required to satisfy the conditions for the operation of the large-size reproduction key, the setting of the large-sized original document tray and the selection of the large-sized transfer paper, at the same time.

Whenever the three conditions are satisfied as mentioned above, no erroneous selection of the reproduction mode for a large-sized original document and any erroneous reproduction can surely be prevented.

In addition to the above, the setting of a large-sized original document tray and the selection of a large-sized transfer paper can intentionally be made, and therefore the large-sized original document reproduction mode can also be deemed to have been selected at the point of time when the above-mentioned two conditions are satisfied.

There is also a case of reducing a large-sized original document to reproduce on an ordinary-sized transfer paper (i.e., from an A2 sized original document to an A3 sized transfer paper). In order to satisfy this case, either the selection of large-sized transfer paper or the selection of the reduction reproduction mode for the large-sized original document is to be detected, besides the operation of the large-size reproduction key and the detection of setting the large-sized original document tray.

In the case of the reduction reproduction in the above-mentioned reproduction mode for a large-sized original document, the original document feed speed will become faster, and incidentally the original document feed speed will be slower in the case of a magnification reproduction.

What is claimed is:

1. An electrostatic recording apparatus having a first mode wherein an original document placed on a document table is scanned by a movable optical system and a second mode wherein an original document is scanned by a stationary optical system during a transportation of said document, said apparatus comprising:
   receiving means for receiving a large-sized original document,
   selecting means for selecting said second mode, first detecting means for detecting said large-sized original document which is received by said receiving means, and
   first means for preventing a selection of said second mode when said detecting means does not detect said large-sized original.

2. The apparatus of claim 1, further comprising a second detecting means for detecting a size of recording paper, and a second means for preventing selection of said second mode when said size of recording paper is smaller than a minimum size within which said large-sized document can be completely copied.

3. The apparatus of claim 1, wherein said stationary fixed optical system is formed by maintaining said movable optical system at a predetermined position.

4. A method of operating an electrophotographic recording apparatus having a first mode wherein an original document placed on a document table is scanned by a movable optical system and a second mode wherein an orginal document is scanned by a stationary fixed optical system during transportation of said document, said method comprising: determining the presence or absence of a large-sized document, and
   preventing selection of said second mode when said large-sized document is not detected.

5. The method of claim 4, further comprising detecting a size of recording paper, preventing selection of said second mode when said size of recording paper is smaller than a minimum size in which said large-sized document can be completely copied.

6. The electrostatic recording apparatus as claimed in claim 1, wherein the principal processing conditions of said electrostatic recording apparatus are arranged so as to be changed.

* * * * *